United States Patent
Zürcher et al.

(10) Patent No.: US 6,505,711 B1
(45) Date of Patent: Jan. 14, 2003

(54) HYDRAULIC ELEVATOR, COMPRISING A PRESSURE ACCUMULATOR WHICH ACTS AS A COUNTERWEIGHT AND A METHOD FOR CONTROLLING AND REGULATING AN ELEVATOR OF THIS TYPE

(75) Inventors: Josef Zürcher, Neuheim (CH); Daniel Moser, Menzingen (CH)

(73) Assignee: Bucher Hydraulics AG, Neuheim (CH)

( * ) Notice: Subject to any disclaimer, the term of this patent is extended or adjusted under 35 U.S.C. 154(b) by 250 days.

(21) Appl. No.: 09/980,073

(22) PCT Filed: Aug. 8, 2000

(86) PCT No.: PCT/CH00/00421

§ 371 (c)(1),
(2), (4) Date: Nov. 28, 2001

(87) PCT Pub. No.: WO01/14238

PCT Pub. Date: Mar. 1, 2001

(30) Foreign Application Priority Data

Aug. 25, 1999 (CH) ................................. 1551/99

(51) Int. Cl.$^7$ ............................. B66B 5/06; B66B 1/24
(52) U.S. Cl. ................................... 187/285; 187/275
(58) Field of Search ........................... 187/272, 274, 187/275, 273, 215, 229, 234, 286, 285, 287; 91/452, 453, 454, 455, 446, 458, 459; 92/DIG. 2

(56) References Cited

U.S. PATENT DOCUMENTS

| | | | | |
|---|---|---|---|---|
| 3,601,235 A | * | 8/1971 | Huf | 187/254 |
| 3,955,649 A | | 5/1976 | Takenoshita et al. | |
| 4,418,794 A | * | 12/1983 | Manco | 187/275 |
| 4,637,495 A | * | 1/1987 | Blain | 187/286 |
| 4,715,478 A | * | 12/1987 | Nakamura et al. | 187/286 |
| 4,932,502 A | * | 6/1990 | Blain et al. | 187/286 |
| 5,040,639 A | * | 8/1991 | Watanabe et al. | 187/275 |
| 5,082,091 A | * | 1/1992 | Fargo | 187/275 |
| 5,243,154 A | * | 9/1993 | Tomisawa et al. | 187/286 |
| 5,373,121 A | * | 12/1994 | Nagel | 187/275 |
| 5,648,644 A | * | 7/1997 | Nagel | 187/288 |
| 5,975,246 A | * | 11/1999 | Toschi | 187/275 |
| 6,142,259 A | | 11/2000 | Veletovac et al. | |
| 6,422,349 B1 | * | 7/2002 | Veltovac | 187/272 |

FOREIGN PATENT DOCUMENTS

| | | | | |
|---|---|---|---|---|
| DE | 30 40 717 | | 5/1982 | ............ B66B/9/04 |
| DE | 003629032 A1 | * | 4/1988 | ............ B66B/1/04 |
| EP | 0254 840 | | 6/1987 | ............ B55F/7/04 |
| WO | 98/34868 | | 8/1998 | ............ B66B/1/04 |
| WO | 99/32388 | | 7/1999 | ............ B66B/9/04 |

* cited by examiner

Primary Examiner—Jonathan Salata
(74) Attorney, Agent, or Firm—Cohen, Pontani, Lieberman & Pavane

(57) ABSTRACT

A hydraulic elevator with a pressure accumulator acting as a counterweight, includes a first pump for conveying hydraulic oil through a pump line, at least one valve unit, and a cylinder line to and from a hydraulic drive for a car, a second pump for conveying hydraulic oil by way of a solenoid valve from and to the pressure accumulator, which hydraulic oil can be supplied to and withdrawn from a tank. The two pumps are connected rigidly to each other and can be driven by an electric motor, the speed of which can be regulated. A single valve unit is installed between the first pump and the hydraulic drive, the valve unit being a relay-controllable valve and a first nonreturn valve connected in parallel to the relay-controllable valve. A control/automatic regulation unit is provided, and in order to control the speed of the car, acts on a power regulating unit for the electric motor, on the solenoid valve, and also, during descents, on the relay-controllable valve. A process for control and regulation of the operation of the elevator is provided, the elevator and its operation being such as to reduce the amount of electric energy required to drive the motor and thus to operate the hydraulic elevator.

12 Claims, 2 Drawing Sheets

HYDRAULIC ELEVATOR, COMPRISING A PRESSURE ACCUMULATOR WHICH ACTS AS A COUNTERWEIGHT AND A METHOD FOR CONTROLLING AND REGULATING AN ELEVATOR OF THIS TYPE

BACKGROUND OF THE INVENTION

The invention pertains to a hydraulic elevator with a pressure accumulator acting as a counterweight wherein a first pump conveys hydraulic oil through a pumpline, a valve unit and a cylinder line to and from a hydraulic drive for an elevator car, a second pump conveys hydraulic oil by way of a solenoid valve to and from the pressure accumulator, the hydraulic oil being supplied to and taken from a tank, the two pumps being rigidly connected to each other and driven by an electric motor. The invention further relates to a process for controlling and regulating operation of the elevator.

Hydraulic elevators of the general type in question are suitable for conveying people and goods, for example, between the floors of buildings.

A hydraulic elevator of the general type described above is known from DE-A1 3,040,717. A hydraulic oil can be conveyed by a first pump from a tank to a hydraulic drive unit for an elevator car or from the hydraulic drive to the tank. Hydraulic oil can also be conveyed from a tank to a pressure accumulator or from the pressure accumulator to the tank by a second pump by way of a solenoid-operated valve. The two pumps are rigidly connected to each other and can be driven jointly by means of an electric motor. Thus, when one of the pumps is conveying hydraulic oil, the other pump acts as an auxiliary drive, i.e., as a hydraulic motor. In and of itself, the motor is called upon to provide only the amount of energy corresponding to the difference between the potential energy in the hydraulic drive and that in the pressure pressure accumulator. This has the effect of reducing the energy consumption as long as the potential energies present in the hydraulic drive and in the pressure accumulator are properly adjusted with respect to each other. To control the travel of the elevator car operated by the hydraulic drive, the object of DE-A1 3,040,717 requires two controllable valves, namely, one valve for upward travel and one valve for downward travel. One of these valves is opened slowly when the car is to be started from a standstill or closed slowly when the car is to be slowed before coming to a stop again. The motor driving the pumps is turned off after the car has stopped. A dissipation of energy occurs in each of these servovalves during both the startup and the slowdown phase, during both ascents and descents. This results not only in a waste of energy but also in the heating of the hydraulic oil, which reaches a relatively high temperature. It is known that the behavior of an elevator car is negatively affected by variations in the temperature of the hydraulic oil.

A process and a device for controlling a hydraulic elevator is known from WO-A1 98/34,868, in which the speed and thus the output of a pump, driven by a motor, are controlled and/or regulated. The energy expended to lift the car is present after the ascent as potential energy in the car; and at least some of this energy is recovered during the descent, in that the potential energy of the car is used to operate the pump as a hydraulic motor and the electric motor as a generator. The electrical energy thus produced is either returned by way of a feedback unit to the power system or destroyed by braking resistances.

SUMMARY OF THE INVENTION

An object of the present invention is to provide a hydraulic elevator and a method for controlling the elevator which reduces the amount of energy required to operate the elevator. A reduction in the energy expenditure is simultaneously associated with greater economy of operation.

The object of the present invention is achieved by a hydraulic elevator comprising an elevator car with a hydraulic drive. A first pump is connected to the hydraulic drive through a pump line, a valve unit and a cylinder line so that the valve unit is arranged between the first pump and the hydraulic drive. The first pump also being connected to a tank having hydraulic oil. The valve unit includes a controllable valve and a first nonreturn valve connected in parallel with said controllable valve. During operation, the first pump selectively conveys hydraulic oil to and from the hydraulic drive. The hydraulic elevator also includes a pressure accumulator acting as a counterweight. A second controllable valve is arranged between the pressure accumulator and a second pump. During operation, the second pump selectively conveys hydraulic oil to and from said pressure accumulator through said second controllable valve. The first and second pumps are fixedly connected such that when hydraulic oil is conveyed to the hydraulic elevator by the first pump, hydraulic oil is conveyed from the pressure accumulator by the second pump. An electric motor is connected for driving the first and second pumps. A power regulating unit is connected to the electric motor for actuating the electric motor and a control/automatic regulation unit is connected to the power regulating unit and the first and second controllable valves for controlling and automatically regulating a speed of said elevator car by controlling actuation of said power regulating unit and the second controllable valve, and for actuating the first controllable valve during a descent of the elevator car.

BRIEF DESCRIPTION OF THE DRAWINGS

Exemplary embodiments of the invention are explained below on the basis of the drawings in which.

DESCRIPTION OF THE PRESENTLY PREFERRED EMBODIMENTS

Figure 1:
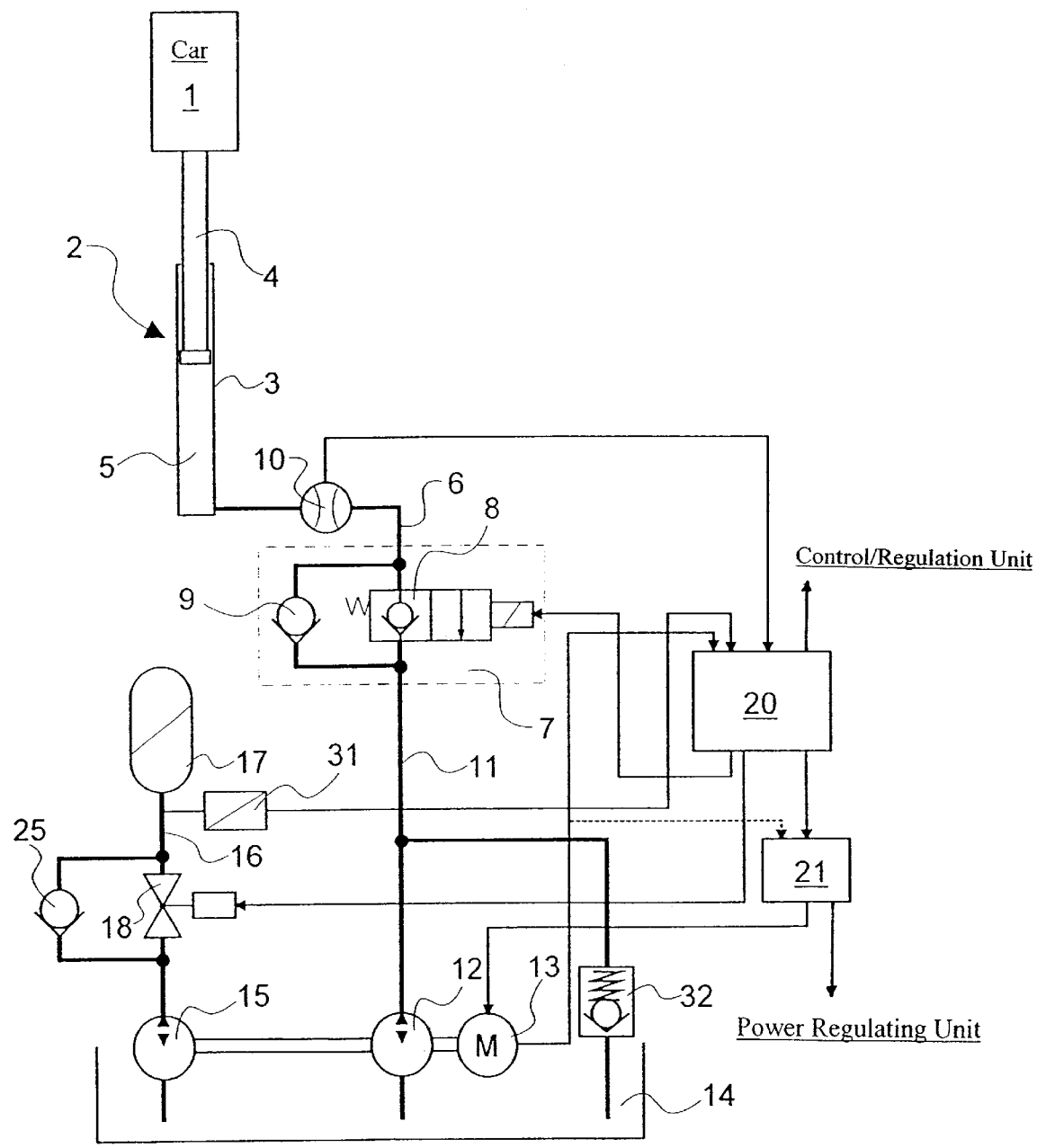
FIG. 1 is a block diagram of the device according to an embodiment of the present invention.

FIG. 1, reference number 1 designates an elevator car serving to transport people and/or goods, which car can be moved by a hydraulic drive 2 in the vertical direction. In a manner known in itself, the hydraulic drive 2 consists of a cylinder 3, in which a piston 4, which is connected to the car 1, is free to move. Inside the cylinder 3, a pressure space 5 is present, which is filled with hydraulic oil. The piston 4 and thus the car 1 can be moved by supplying hydraulic oil to this pressure space 5 or by removing oil from it. A cylinder line 6 leads from the pressure space 5 to a valve unit 7, which, according to the invention, consists essentially of a relay-controllable valve 8 and, connected in parallel to it, a first nonreturn valve 9. In the course of the cylinder line 6 there is a flow sensor 10, which serves to detect the flow of hydraulic oil from and to the pressure space 5, as a result of which the motion of the car 1 can be monitored.

The valve unit 7 is also connected by a pump line 11 to a first pump 12. By means of the pump 12, the hydraulic oil can be conveyed via the valve unit 7 to and from the pressure space 5 of the hydraulic drive 2. The pump 12 is driven by a motor 13, which is rigidly connected to the pump 12. The rotational direction and the rotational speed of the motor 13 can be controlled. The motor thus determines whether the car 1 is moved up or down and at what speed this motion occurs. The hydraulic oil, which the pump 12 conveys, is taken from and returned to a tank 14.

A second pump 15, furthermore, is rigidly connected to the first pump 12 and to the motor 13. The two pumps 12, 15 transport the oil in opposite directions, as will be explained further below. The second pump 15 is connected by an accumulation line 16 to a pressure accumulator 17; a solenoid-operated valve 18 is installed at a certain point along this accumulation line 16. This solenoid valve 18 is an on-off valve, which is therefore either open or closed. The flow between the pump 15 and the pressure accumulator 17 can therefore be blocked. The pressure accumulator 17 is advantageously a bladder accumulator.

The relay-controllable valve 8 of the valve unit 7 and the solenoid valve 18 can be actuated by a control/automatic regulation unit 20. The motor 13 can be actuated by a power regulating unit 21, which is actuated in turn by the control/automatic regulation unit 20. The flow sensor 10 is also connected to the control/automatic regulation unit 20, which automatically controls the movement of the car 1.

According to the invention, a single valve unit 7 is provided between the first pump 12 and the hydraulic drive 2, which valve unit consists of a relay-controllable valve 8 and, connected in parallel to it, a first nonreturn valve 9. So that the motion of the car 1 can be controlled and regulated in both directions in spite of the lack of separate control valves for upward and downward travel, it is provided in accordance with the invention that the speed of the electric motor 13 can be automatically controlled by a control/automatic regulation unit 20, this control/automatic regulation unit 20 also acting on the solenoid-operated valve 18 and, during descents, on the relay-controllable valve 8.

The way in which the invention works will now be described below in detail. When the car 1 is at a standstill, the control/automatic regulation unit 20 is not controlling any of the elements which it can control. The solenoid valve 18 is therefore closed; the relay-controllable valve 8 is also closed. The motor 13 is not rotating, and therefore the pumps 12 and 15 are not operating either. Because the pressure in the cylinder line 6 under the load of the car 1 acting on the hydraulic drive 2 is greater than the pressure in the pump line 11, the first nonreturn valve 9 is also closed.

To enable the car 1 to ascend, the control/automatic regulation unit 20 first actuates the motor 13 in such a way that it and the two pumps 12, 15 start to operate in a first or ascent direction of rotation. As a result, the first pump 12 slowly builds up the pressure in the pump line 11. At the same time, the control/automatic regulation unit 20 actuates the solenoid valve 18, which therefore opens. Thus the pressure prevailing in the pressure accumulator 17 acts on the second pump 15, which starts to operate as a hydraulic motor, and thus also on the shaft common to the pumps 12 and 15 and the motor 13. The pressure of the pressure accumulator 17 thus generates a torque on this shaft. Because of previously mentioned fact that the two pumps 12, 15 transport the oil in opposite directions, the torque generated by the second pump 15 drives the first pump 12 in such a way that it conveys hydraulic oil from the tank 14 toward the value unit 7 and the hydraulic drive 2. The torque to be generated by the motor 13 during the ascent of the car 1 is therefore reduced by the amount which the second pump 15 generates as a result of the pressure in die pressure accumulator 17.

As soon as the pressure in the pump line 11 generated by the cooperation between the motor 13 and the pumps 12, 15 is greater than the pressure in the cylinder line 6, the first nonreturn valve 9 opens automatically, and hydraulic oil flows into the pressure space 5 of the hydraulic drive 2. According to the invention, the speed of the car 1 is controlled during an ascent exclusively by control and automatic regulation of the speed of the motor 13 and thus of the pumps 12, 15. A control valve for upward travel is therefore not required according to the invention. As soon as the motor 13 has started, it is advantageous for its speed to be controlled first. As soon as hydraulic oil begins to flow into the pressure space 5 after the first nonreturn valve 9 has opened, this flow is detected by the flow sensor 10, and the corresponding signal is transmitted to the control/automatic regulation unit 20. Now it is possible to change from control of the speed of the motor 13 to the automatic regulation of its speed and thus to the automatic regulation of the speed of the car 1. The control and then the automatic regulation are both based on predetermined operating curves.

When the speed of the motor 13 is reduced to decrease the speed of the car before the end of an ascent according to the predetermined operating curve, the pressure produced by the first pump 12 in the pump line 11 decreases, which ultimately leads to the automatic closure of the first nonreturn valve 9. At this point the car 1 stops, and the control signal transmitted by the control/automatic regulation unit 20 to the solenoid valve 18 stops also, so that the solenoid valve 18 closes.

To allow the car 1 to descend, the control/automatic regulation unit 20 first operates the motor 13 at a low, constant speed in a second or descent direction of rotation and simultaneously actuates the relay-controllable valve 8. The solenoid valve 18 is also actuated, so that it opens and allows the hydraulic oil to flow from the tank 14 to the pressure accumulator 17. Here, too, the torques being generated by the pumps 12, 15 and those generated by the pressure in the pressure space 5 and the pressure accumulator 17 all contribute. By the continuing actuation of the relay-controllable valve 8 as a function of the predetermined operating curve, the relay-controllable valve opens increasingly, and as a result hydraulic oil flows from the pressure space 5 to the tank 14, conveyed by the first pump 12. Simultaneously, the second pump 15 conveys hydraulic oil from the tank to the pressure accumulator 17.

The flow of hydraulic oil from the pressure space 5 toward the tank 14 is detected by the flow sensor 10, and the corresponding signal is transmitted to the control/automatic regulation unit 20. When a predetermined speed is reached, the relay-controllable valve 8 is completely opened, and from that moment on the speed of the car 1 is exclusively controlled by the control and automatic regulation of the speed of the motor 13 and thus of the pumps 12, 15 on the basis of a predetermined operating curve, as in the previous case of ascending travel. The first pump 12 acts as a hydraulic motor, and the torque it generates is used to increase the pressure being built up in the pressure accumulator 17 by the second pump 15.

It is advantageous to install a second nonreturn valve 25 in parallel with the solenoid valve 18 to allow the flow of hydraulic oil when the pressure generated by the pump 15 is greater than the pressure in the pressure accumulator 17. As a result, the goal is achieved that there is no need at all to actuate the solenoid valve 18 during a descent.

When the speed of the motor 13 is reduced before the end of a descending trip to decrease the speed of the car according to the predetermined operating curve, the relay-controllable valve 8 is actuated again as soon as a predetermined speed is reached, at which point the motor now starts to operate at a low, constant speed. The degree to which the relay-controllable valve 8 is actuated is now reduced until it is completely closed. Now the car 1 is at a standstill, and the control signal being transmitted by the control/automatic regulation unit 20 to the solenoid valve 18 also stops, with the result that the solenoid valve 18 closes.

The invention leads to the result that the motor 13 can be designed with a very low rated output; that is, the motor is required to deliver only the power required to make up the effective difference between the torques of the pumps 12, 15 and the torque required to move the car 1. At the same time, the speed of the motor 13 is being controlled or automatically regulated. As a result, the amount of energy consumed is considerably less than that of the previously known state of the art.

Another goal achieved by the invention is that all of the potential mechanical energy can be utilized. A conversion to electrical energy, as in WO-A1 98/34,868, or even the destruction of electrical energy by braking resistances, is not required, which is advantageous not only with respect to the energy balance but also with respect to the investment costs, because the relevant components are not required. In addition, there is almost no need to use servovalves to destroy hydraulic energy as done in DE-A1 3,040,717, where the servovalves assigned to the two travel directions are used for this purpose during both ascending and descending travel. In the present invention, this need is limited to the starting and ending phases of descending travel. This also offers the advantage that the hydraulic oil does not heat up as much, which almost always means that the need for an oil cooler is eliminated, leading in turn to additional cost benefits. Minimizing the fluctuations in the temperature of the hydraulic oil also offers advantages with respect to the automatic regulation of the speed of the car.

Additional advantageous designs are described in the following. It is advantageous to install a pressure switch 31, which is connected to the control/automatic regulation unit 20, on the pressure accumulator 17. The pressure switch 31 is designed so that it can monitor and signal two nominal pressure values. The first is a lower value, at which a recharging of the pressure accumulator 17 is indicated; the second is a maximum value. When the car 1 is stopped, the control/automatic regulation unit 20 checks the status of the pressure switch 31. If this check shows that the pressure in the pressure accumulator 17 has dropped below the specified limit value, the control/automatic regulation unit 20 actuates the motor 13 in such a way that the second pump 15 conveys hydraulic oil from the tank 14 to the pressure accumulator 17. To make this possible, the solenoid valve 18 is also actuated, so that it opens. Because of the rigid coupling between the motor 13 and the pumps 12, 15, the first pump 12 draws hydraulic oil from the valve unit 7 in this situation. Because this valve unit 7 blocks the flow when the car 1 is stopped, however, a negative pressure would develop in the line leading from the valve unit 7 to the pump 12. To prevent this, a secondary inlet valve 32 is advantageously installed parallel to the pump 12 between the pump line 11 and the tank 14, through which valve hydraulic oil is drawn out of the tank 14 when the pressure in the pump line 11 falls below a certain value. A first side of secondary valve 32 is connected to pump line 11 and a second side of the secondary valve 32 communicates with tank 14. This secondary inlet valve 32 also acts at the beginning of the descent of the car 1, when the motor 13 is running and thus the first pump 12 is conveying hydraulic oil, but the relay-controllable valve 8 is still completely closed. This secondary inlet valve 32 operates automatically and thus requires no actuation.

It is advantageous to design the two pumps 12, 15 for different outputs. The first pump 12 is rated to provide the desired operating speed in conjunction with the specific properties of the hydraulic drive 2. In contrast, the second pump 15 has a smaller specific discharge but operates at a higher pressure level.

The system described above and the way in which the system works as explained above offer the advantage that it makes no difference to the control or regulation system whether the pressure accumulator 17 is a bladder accumulator or a weighted piston-type pressure accumulator. Whereas the pressure of a weighted piston pressure accumulator is constant and the stored energy is determined by the position of the piston, the pressure of a bladder accumulator changes with the load state. Because the pressure of the bladder accumulator determines the torque acting on the second pump, this torque is also variable. Because, in the elevator according to the invention described above, the speed of the car is controlled by the control or automatic regulation of the speed of the electric motor 13 under consideration of the signal from the flow sensor 10, the varying pressure of a bladder accumulator does not have any negative effect on the regulation system. Thus a bladder accumulator can be used in the elevator according to the invention, which offers advantages with respect to the structural dimensions of the system.

The process according to the invention for controlling and regulating a hydraulic elevator of this type, the operation of which has already been described above, will be presented below in context.

According to the invention, the speed of the motor 13 is controlled and regulated by the control/automatic regulation unit 20 according to the values of a predetermined operating curve; at approximately the same time, the solenoid valve 18 is actuated. Thus, in contrast to the previously known state of the art, a considerable reduction is achieved in the amount of electric drive energy required. The rotational speeds of the motor 13 and of the pumps 12, 15, which are in some cases much lower than those of the previously known state of the art according to DE-A1 3,040,717, also result in a lower noise level, which is advantageous.

It is advantageous for the motor 13 to operate in its first rotational direction at a first, low, constant speed at the beginning of an ascent of the car 1. Then, after the flow sensor 10 installed in the cylinder line 6 has indicated that the hydraulic oil is flowing, it is advantageous for the speed of the electric motor 13 to be automatically regulated in accordance with the predetermined operating curve.

The above-mentioned slow, constant speed corresponds approximately to the low speed stage normally used in elevators of this type, which is known as "crawl".

At the beginning of the descent of the car 1, it is advantageous for the motor 13 to operate in its second direction of rotation at a first, slow, constant speed, and approximately at the same time for the relay-controllable valve 8 of valve unit 7 to be opened in accordance with the predetermined operating curve. Then, after the flow sensor 10 installed in the cylinder line 16 has indicated a predetermined flow of hydraulic oil, the relay-controllable valve 8 of the valve unit 7 opens completely, and the speed of the motor 13 is automatically regulated in accordance with the predetermined operating curve. Toward the end of the descent of the car 1, the relay-controllable valve 8 starts to close according to the predetermined operating curve, and then, after the car 1 has come to a complete stop, the relay-controllable valve 8 is closed, and the motor 13 is brought to a standstill.

It is advantageous for the speed of the motor 13 to be monitored, in that the actual speed of the motor 13 is detected and transmitted to the power regulating unit 21 or to the control/automatic regulation unit 20.

It is advantageous for the control/automatic regulation unit 20 to evaluate the pressure switch 31 assigned to the pressure pressure accumulator 17 after the car 1 has stopped; and then, if the pressure switch 31 is signaling that the pressure in the pressure accumulator 17 has fallen below a limit value, it is advantageous for the motor 13 to be actuated by the control/automatic regulation unit 20 in such a way that hydraulic oil is conveyed by the second pump 15 from the tank 14 to the pressure accumulator 17 until the pressure switch 31 signals the control/automatic regulation unit 20 that the pressure in the pressure accumulator 17 has reached a maximum value.

Figure 2:
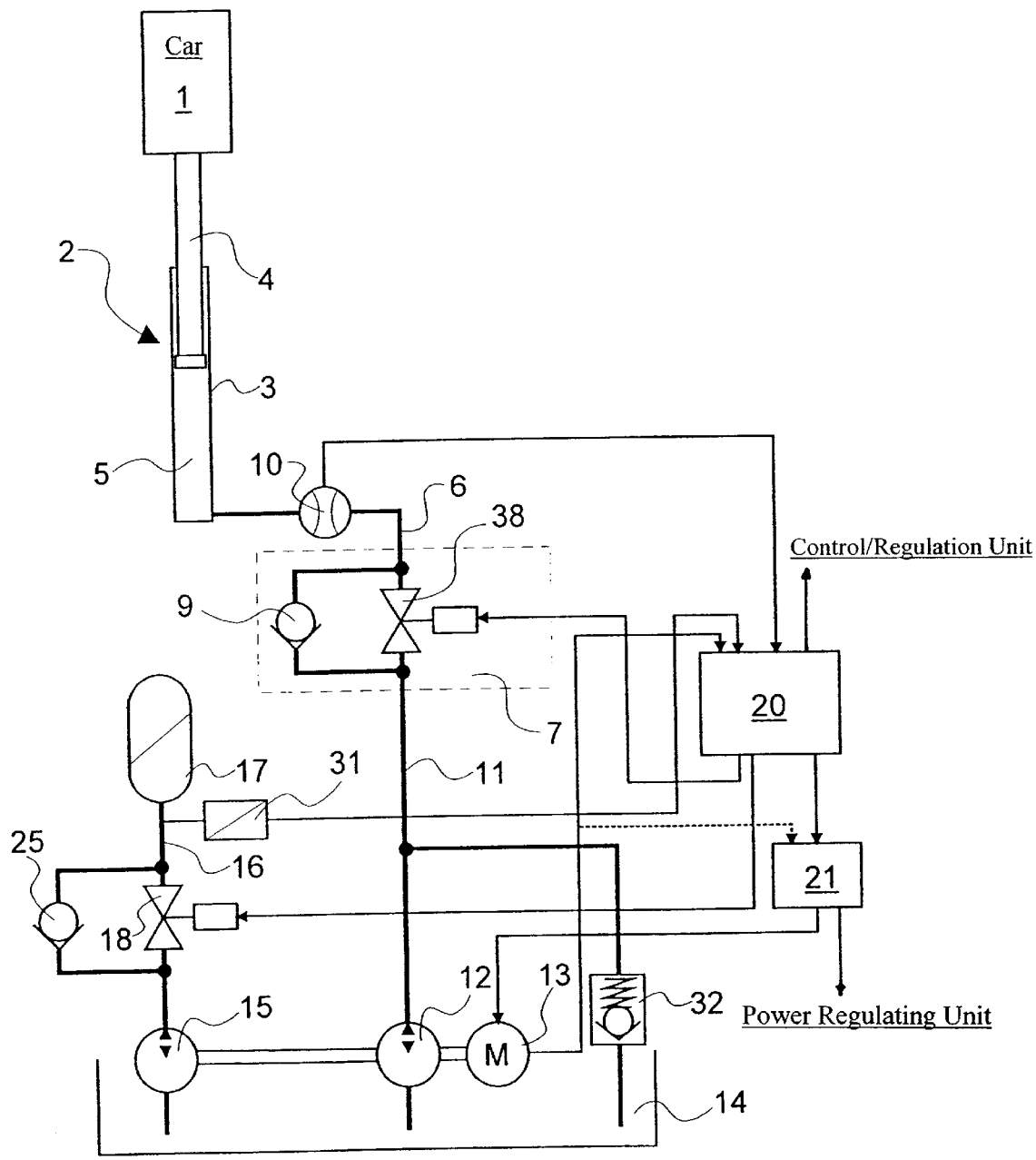
FIG. 2 is a block diagram showing a further embodiment of the device according to the present invention.

FIG. 2 shows a variant of the device, which embodies an advantageous design. The only difference with respect to FIG. 1 is that the relay-controllable valve 8 in the valve unit 7 has been replaced by another solenoid valve 38.

As described previously in association with the exemplary embodiment according to FIG. 1, the relay-controllable valve 8 of the valve unit 7 is actuated at the beginning of a descent and then, after a certain speed has been reached, it is opened completely. Before the end of the descent, it is actuated again and finally closed.

In the exemplary embodiment according to FIG. 2, the control of the ascent is the same as explained above. The only difference pertains to the control of the descent.

Before the car 1 starts to descend, the control/automatic regulation unit 20 first actuates the motor 13 so that it operates at a slow, constant speed in the first direction, that is, in the rotational direction which is required otherwise for an ascent. The solenoid valve 18 is actuated so that it opens and thus allows hydraulic oil to flow from the tank 14 to the pressure accumulator 17. Here again, the torques which are generated by the pumps 12, 15 and by the pressures in the pressure space 5 and in the pressure accumulator 17 also contribute to the overall effect. As a result of the rotation of the motor 13 in the first direction, the pump 12 slowly builds up the pressure in the pump line 11. As soon as the pressure in the pump line 11 is greater than the pressure in the cylinder line 6, the nonreturn valve 9 opens. Thus hydraulic oil flows into the cylinder line 6 and the flow sensor 10 responds. The car 1 does not start to ascend at this point, however, because it is necessary for compression work to be accomplished first, and there are also frictional resistances to be overcome. The signal from the flow sensor 10 is transmitted again to the control/automatic regulation unit 20. As soon as the flow sensor 10 detects the beginning of the flow of hydraulic oil, the control/automatic regulation unit 20 actuates the solenoid valve 38 so that it opens, and the control/automatic regulation unit 20 now controls or automatically regulates the motor 13 and thus the pumps 12, 15. The motor 13, which has been running at a slow, constant speed in the first direction before the beginning of the descent, is now actuated so that the speed in the first direction is decreased until, after a short time, the motor 13 comes to a stop. Immediately thereafter, the rotational direction of the motor 13 is reversed, so that it now runs in the second direction, and thus the descent of the car 1 begins. From this point on, the control or automatic regulation of the downward speed of the car 1 is accomplished in the same way as it was during the ascent, i.e., exclusively by controlling or automatically regulating the speed of the motor 13 and thus of the pumps 12, 15 on the basis of a predetermined operating curve. The first pump 12 acts as a hydraulic motor in this situation and the torque it generates is used to increase the pressure being built up in the pressure accumulator 17 by the second pump 15.

Before the end of the descent, the speed of the motor 13 is reduced to decrease the speed of the descent in correspondence with the predetermined operating curve. The speed of the motor 13 is then reduced to such an extent that finally no more hydraulic oil is flowing from the cylinder line 6 through the valve unit 7 to the pump line 11. At this moment, the solenoid valve 38 is no longer being actuated by the control/automatic regulation unit 20, so that it closes. Now the car 1 comes to a stop, and the control signal transmitted by the control/automatic regulation unit 20 to the solenoid valve 18 stops also, so that the solenoid valve 18 closes.

The exemplary embodiment in FIG. 2 therefore differs from that according to FIG. 1 in that the relay-controllable valve 8 has been replaced by the solenoid valve 38, which is advantageous in terms of cost. This is made possible by the fact that, right at the beginning and just before the end of a descent, the control of the speed of the car 1 is accomplished exclusively by the automatic regulation of the speed of the motor 13. Thus, before the beginning of a descent, the motor 13 is first operated in the first direction of rotation to build up the required pressure. It is a remarkable advantage that, it is thus possible to eliminate completely the need for relay-controllable valves in the control system of a hydraulic elevator. Another advantage pertains to the simplicity of the control or automatic regulation algorithm; that is, during the various control or automatic regulation sequences, there is no need to change the automatic regulation from one element to another, and thus all of the problems associated with such changeovers are eliminated.

The lower energy expenditure achieved according to the invention has the result that the motor 13 and the required drive components can be smaller, which offers cost advantages. The lower electrical installed load also means a cost advantage.

The control and regulation concept according to the invention and its advantageous embodiments results in a high level of passenger comfort even in situations where the loads of the car 1 vary and the viscosity of the hydraulic oil changes.

What is claimed is:

1. A hydraulic elevator, comprising:

an elevator car;

a hydraulic drive for moving said elevator car in a vertical direction;

at least one valve unit including a first controllable valve and a first nonreturn valve connected in parallel with said first controllable valve;

a cylinder line connected between said hydraulic drive and said at least one valve unit;

a first pump;

a pump line connected between said at least one valve unit and said first pump such that said valve unit is arranged between said first pump and said hydraulic drive;

a tank holding hydraulic oil, said first pump being connected to said tank and operative for selectively conveying hydraulic oil to and from said hydraulic drive through said pump line, said at least one valve unit and said cylinder line;

a pressure accumulator acting as a counterweight;

a second pump connected to said tank;

a second controllable valve comprising a solenoid valve arranged between said pressure accumulator and said second pump, said second pump being operative for selectively conveying hydraulic oil to and from said pressure accumulator through said solenoid valve, said first pump and said second pump being fixedly connected to each other such that when hydraulic oil is conveyed to said hydraulic drive by said first pump, hydraulic oil is conveyed from said pressure accumulator by said second pump;

an electric motor connected for driving said first and second pumps;

a power regulating unit for controlling said electric motor; and a control/automatic regulation unit for controlling and automatically regulating a speed of ascent and descent of said elevator car by controlling actuation of said power regulating unit for controlling said electric motor and controlling actuation of said second controllable valve, said control/automatic regulation unit further controlling actuation of said first controllable valve during the descent of said elevator car.

2. A hydraulic elevator according to claim 1, further comprising a second nonreturn valve connected in parallel with said second controllable valve.

3. A hydraulic elevator according to claim 1, further comprising a flow sensor arranged in said cylinder line, said flow sensor being connected to said control/automatic regulation unit.

4. A hydraulic elevator according to claim 1, further comprising a secondary inlet valve connected in parallel with said first pump, said secondary inlet valve including a first side connected to said pump line and a second side communicating with said tank.

5. A hydraulic elevator according to claim 1, further comprising a pressure switch operatively attached to said pressure accumulator, said pressure switch being connected to said control/automatic regulation unit.

6. A hydraulic elevator according to claim 1, wherein said first controllable valve is a relay-controllable valve and said second controllable valve is a solenoid valve.

7. A hydraulic elevator according to claim 1, wherein each of said first and second controllable valves is a solenoid valve.

8. A process for the control and regulation of a hydraulic elevator, wherein the hydraulic elevator includes an elevator car and a hydraulic drive for vertically moving the elevator car, a first valve unit, a cylinder line connected between the first valve unit and the hydraulic drive, a tank containing hydraulic oil, a first pump connected to the tank and operative for selectively conveying hydraulic oil to and from the hydraulic drive through the first valve unit, a pressure accumulator acting as a counterweight, a second pump connected to the tank, a second valve unit arranged between the second pump and the accumulator, the second pump being operative for selectively conveying hydraulic oil to and from the pressure accumulator through the second valve unit, the first and second pumps being fixedly connected such that hydraulic oil is pumped from the pressure accumulator by the second pump when hydraulic oil is conveyed to the hydraulic drive by the first pump, and an electric motor connected for driving the first and second pumps, said process comprising the step of:

(a) controlling a speed of the elevator car during ascent and descent of the elevator car by controlling and regulating a speed of said electric motor in accordance with values of an operating curve and actuating said first valve unit controlling the electric motor.

9. The process according to claim 8, further comprising the steps of:

(b) operating the electric motor in an ascent direction of rotation at a first constant speed at a beginning of an ascent of the elevator car;

(c) detecting whether hydraulic oil is flowing through the cylinder line while operating the electric motor in the ascent direction at a first constant speed; and (d) regulating the speed of the electric motor in accordance with the operating curve after a flow of hydraulic oil flow is detected in the cylinder line.

10. The process according to claim 8, wherein said first valve unit is a relay-controllable valve and said process further comprises the steps of:

(e) operating the electric motor in a descent direction of rotation at a first descent speed at a beginning of a descent of the elevator car and opening the relay-controllable valve in accordance with the operating curve at an approximately same time as said step of operating the electric motor at a first descent speed;

(f) detecting hydraulic oil flow from the hydraulic drive during said step (e);

(g) opening said relay-controllable valve to a completely open position and regulating the speed of the electric motor in accordance with the operating curve in response to the detection of a flow greater than or equal to a predetermined flow by said step (f);

(h) initiating closure of the relay-controllable valve in accordance with the operating curve toward an end of the descent of the elevator car; and (i) closing the relay-controllable valve and stopping said electric motor when the elevator car descent is stopped.

11. A process according to claim 8, further comprising the steps of:

(j) operating the electric motor in an ascent direction of rotation at a first constant ascent speed before a start of an elevator car descent until a predetermined flow of hydraulic oil in the cylinder line is detected;

(k) regulating the speed of the electric motor in accordance with the operating curve by reducing the speed of the electric motor until the motor stops after said step (i);

(l) operating the electric motor in a descent direction of rotation after said step (k); and (m) reducing the speed of the electric motor in the descent direction of rotation before the elevator car reaches an end of descent so that the first valve unit is closed and the electric motor is stopped when the elevator car descent stops.

12. A process according to claim 8, wherein the elevator further includes a pressure switch for detecting a pressure of said accumulator and a control/automatic regulation unit to which said pressure switch is connected, said process further comprising the steps of:

(n) evaluating a detected pressure accumulator pressure while the elevator car is stationary; and (o) actuating the electric motor with the control/automatic regulation unit if the detected pressure accumulator pressure is below a limit value in said step (n) so that the second pump operates to convey hydraulic oil from the tank to the pressure accumulator until the pressure switch detects reaching of a maximum pressure value in the pressure accumulator.

* * * * *